Mar. 3, 1925.
R. C. ROOT
VENTILATOR
Filed Jan. 14, 1924
1,528,267
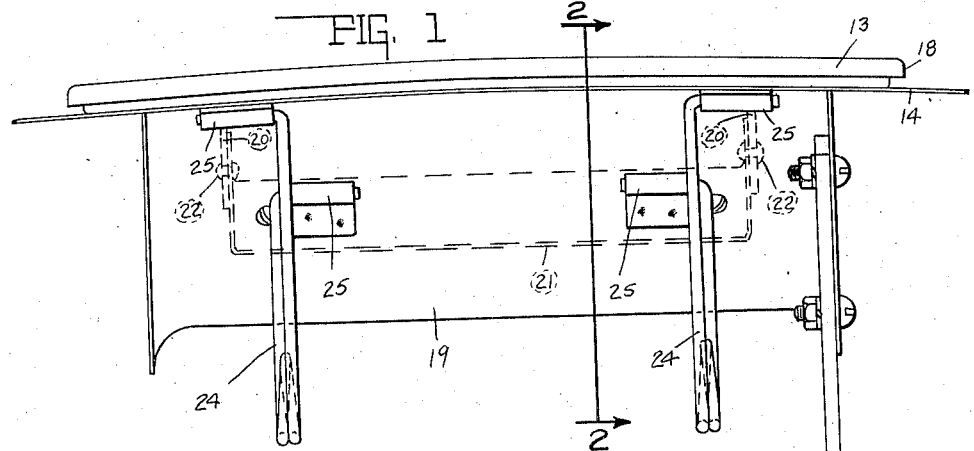
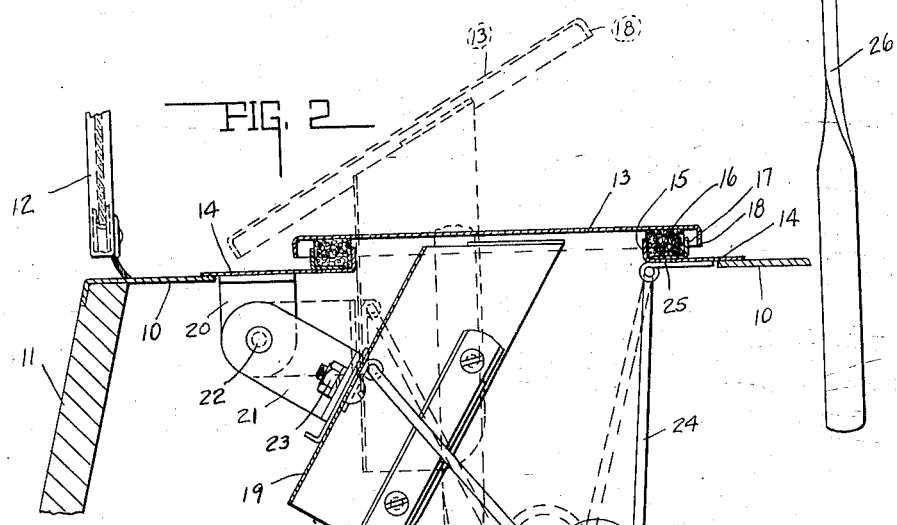
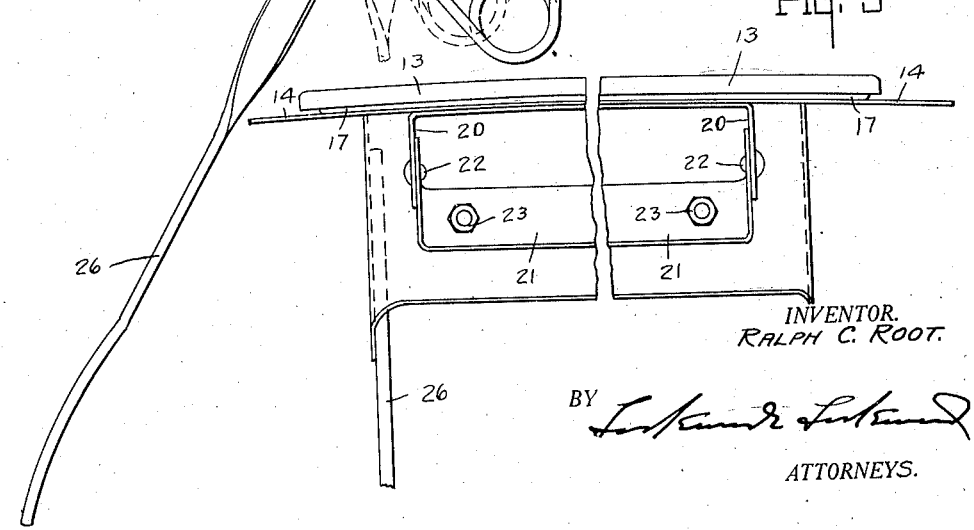
INVENTOR.
RALPH C. ROOT.
BY
ATTORNEYS.

Patented Mar. 3, 1925.

1,528,267

UNITED STATES PATENT OFFICE.

RALPH C. ROOT, OF INDIANAPOLIS, INDIANA.

VENTILATOR.

Application filed January 14, 1924. Serial No. 686,122.

*To all whom it may concern:*

Be it known that I, RALPH C. ROOT, a citizen of the United States, and a resident of Indianapolis, county of Marion, and State of Indiana, have invented a certain new and useful Ventilator; and I do hereby declare that the following is a full, clear, and exact description thereof, reference being had to the accompanying drawings, in which like numerals refer to like parts.

This invention relates to a ventilator particularly adapted for use on vehicle cowls for deflecting and causing fresh air to enter the vehicle through the cowl for counteracting the heat from the motor at that part of the vehicle. Cowl ventilators of this type have been commonly employed as fully disclosed in my Letters Patent No. 1,301,975, dated April 29, 1919.

The main feature of this invention resides in the mechanism for opening and closing the shutter of the ventilator, whereby it will be maintained in both open and closed position under spring pressure, so as to eliminate vibration and rattle without the necessity of making a tight or perfect fit.

Another feature of the invention resides in the shutter control whereby it may be quickly and conveniently opened or closed by the foot or hand by a simple movement.

Still another feature of the invention resides in its structural simplicity, wherein it may be produced at low cost.

The full nature of the invention will be understood from the accompanying drawings and the following description and claims:

In the drawings, Fig. 1 is a front elevation of the ventilator. Fig. 2 is a section taken on the line 2—2 of Fig. 1 showing the same mounted in connection with a cowl and instrument board of a vehicle. Fig. 3 is a rear elevation of the ventilator in closed position.

In the drawings there is shown that portion of a vehicle comprising the cowl 10, instrument board 11 and a portion of the windshield 12. The cowl is provided with a ventilating opening adapted to be closed by a supporting plate 14 upon which is mounted a shutter 13. The shutter 13 is properly curved and designed to conform to the cowl, and the supporting plate 14 is provided about its edge with an upturned flange 15 about which the packing 16, of felt, rubber or the like, is secured by the binding strip 17. The shutter is provided with a downwardly extending peripheral flange 18, adapted when in closed position to surround the packing 16, as shown in Fig. 2. The shutter 13 is rigidly secured upon a suitable bracket plate or apron 19 which extends downwardly therefrom at an angle and is hinged to a pair of downwardly extending ears 20 on the supporting plate 14 by the arms 21. The ends of said arms are pivoted to the ears 20 at 22 and are connected at their other ends and rigidly bolted to the bracket or apron 19 by the nut and bolt 23. Said hinged or pivotal connections are positioned adjacent the ends of the apron so as to properly maintain the shutter in hinged position. The bolt 23 extends through a suitable slot in the apron 19 so that the apron may be adjusted with respect to the arms 21 for securing the proper fit of the shutter with respect to the packing. The pivotal movement of the shutter is best shown in Fig. 2 where it is disclosed in full lines in closed position and dotted lines when swung about the pivotal point 22 to open position.

The shutter is yieldingly held under spring tension in both open and closed position by a spring structure as will be hereinafter described. Near each forward end of the supporting plate 14, there is secured the ends of a pair of spring members 24, the other ends thereof being connected to the apron at about the center thereof, as shown. The spring members 24 are mounted and secured in position under spring tension so as to normally exert an outward or expanding pressure. They are in the form of the usual V-shaped spring with a coil intermediate its ends, the ends thereof being bent laterally to engage in suitable bearings 25 secured to the supporting plate and apron. This arrangement is such that when the shutter is in closed position, the connection between the ends of the spring members and the apron is below dead-center and the expandable pressure of the spring tends to force the apron 19 downwardly and outwardly about the pivot point 22 and cause the shutter to be firmly clamped in closed position by reason of the spring tension of the springs 24 and the downward pressure exerted thereby through the apron 19.

When the apron is manually forced forward, it turns about the pivot point 22 and elevates the shutter to the position shown in dotted lines in Fig. 2. The apron is moved about its pivot point carrying the attached ends of the spring members 24 forwardly and upwardly. Those ends are moved about dead-center so that when the apron reaches its extreme upward position as shown in dotted lines, the outwardly directed pressure exerted by the spring after passing dead-center will then cause the apron and shutter to be held in open position by reason of the same spring tension which holds it in closed position. It is obvious, therefore, that the spring members 24 by reason of their expandable spring pressure yieldingly maintain the shutter in either closed or open position, and the shutter may be changed from one position to the other by manually moving the apron so that the spring connection therewith will pass dead-center one way or the other.

The means for operating the apron and shutter comprises a handle 26 which is rigidly secured to the apron either at one end or to the center if desired, and which extends downwardly and rearwardly to a point just below the instrument board of the vehicle. The lower end of the handle is conveniently located so that the operator of the vehicle may either by hand or foot move the handle 26 backward or forward so as to open or close the shutter.

Whereas this invention has been shown and described as applied to a vehicle, it will be obvious that it may also be adapted to any purpose wherein it is desired to ventilate a compartment such as a room, railway car or the like; or by providing a closure for an opening therein.

The invention claimed is:

1. The combination with the cowl of an automobile having an aperture, of a ventilating mechanism therefor, comprising a shutter adapted to seat over said aperture above the cowl, means for hingeably mounting said shutter on said cowl in position to close said aperture when in lowered position and be swung upwardly therefrom to open position, means connected with said shutter for moving said shutter to open or closed position, and a spring member acting independently of said actuating means and having one end directly connected with the under side of said cowl forwardly of the aperture therein and the other end connected with said shutter for maintaining said shutter in open or closed position under spring tension, said spring being so positioned with respect to said aperture and shutter as to remain below said aperture and on the under side of said cowl when the shutter is in either closed or open position.

2. The combination with the cowl of an automobile having an aperture therein, of a ventilating mechanism therefor, comprising a shutter adapted to seat over said aperture on the upper side of said cowl, means for hingeably mounting said shutter on said cowl, actuating means for controlling the position of said shutter, and a spring member mounted on the under side of said cowl having one end directly connected thereto forwardly of the aperture therein and the other end connected to said actuating means, and in position with respect thereto as to remain at all times on the opposite side of said cowl from said shutter, said spring being adapted to maintain said shutter in closed position or extreme open position under spring tension.

3. The combination with the cowl of an automobile having an aperture therein, of a ventilating mechanism therefor comprising a shutter, means for hingeably mounting said shutter on said cowl so as to close over said aperture on one side thereof, means for actuating said shutter, and a V shaped spring extending downwardly from the under side of said cowl away from said shutter and having one end directly connected with the under side of said cowl forwardly of the aperture therein and the other end connected with a downwardly extending projection on said shutter, whereby said shutter will be maintained in open or closed position under spring tension without any portion of said spring being exposed through said aperture.

4. The combination with a cowl of an automobile having an aperture therein, of a ventilating mechanism comprising a shutter positioned over said aperture and adapted to open upwardly from said cowl, a rearwardly extending depending apron secured to said shutter and extending through said aperture, a rearwardly extending handle secured to said apron for actuating the shutter, and a V shaped spring having one end directly connected with the forward under portion of the cowl, and the other end connected to said apron, said spring being arranged to extend downwardly away from said shutter so as to maintain said shutter in open or closed position under spring tension without projecting through said aperture.

In witness whereof, I have hereunto affixed my signature.

RALPH C. ROOT.